United States Patent
Brillante et al.

(10) Patent No.: US 9,946,977 B2
(45) Date of Patent: *Apr. 17, 2018

(54) METHOD AND SYSTEM FOR PAPERLESS ELECTRONIC QUEUE TICKETING

(71) Applicant: International Business Machines Corporation, Armonk, NY (US)

(72) Inventors: Francesco Brillante, Scafati (IT); Giuseppe Longobardi, Castellammare di Stabia (IT); Alessandro Scotti, Rome (IT); Emilio Spatola, Salerno (IT)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/414,944

(22) Filed: Jan. 25, 2017

(65) Prior Publication Data
US 2017/0169365 A1    Jun. 15, 2017

Related U.S. Application Data

(63) Continuation of application No. 14/968,964, filed on Dec. 15, 2015, now Pat. No. 9,582,952.

(51) Int. Cl.
| | | |
|---|---|---|
| *G06K 5/00* | (2006.01) | |
| *G06Q 10/02* | (2012.01) | |
| *G06K 7/10* | (2006.01) | |
| *G06K 7/14* | (2006.01) | |

(52) U.S. Cl.
CPC ........... *G06Q 10/02* (2013.01); *G06K 7/1095* (2013.01); *G06K 7/10297* (2013.01); *G06K 7/10762* (2013.01); *G06K 7/1417* (2013.01)

(58) Field of Classification Search
CPC ........ G06Q 10/02; G06Q 10/06; G07C 11/00; G07C 2011/04
USPC .......................................................... 235/382
See application file for complete search history.

(56) References Cited

U.S. PATENT DOCUMENTS

2014/0085663 A1* 3/2014 Kavanappillil .... H04N 1/00342
358/1.15
2014/0350976 A1* 11/2014 Salas Fehlandt ...... G06Q 10/02
705/5

OTHER PUBLICATIONS

Brillante, Francesco et al., Pending U.S. Appl. No. 14/968,964 entitled "Method and System for Paperless Electronic Queue Ticketing" filed Dec. 15, 2015.
List of IBM Patents or Patent Applictions Treated As Related; (Appendix P), Filed Jan. 25, 2017, 2 pages.

* cited by examiner

*Primary Examiner* — Seung Lee
(74) *Attorney, Agent, or Firm* — Cantor Colburn LLP; David Zwick

(57) ABSTRACT

A computer-implemented method for paperless electronic queue ticketing is provided. The method includes reading, by a processor of a user device, an electronic ticket code displayed on a ticket device, the electronic ticket code having information and instructions for an electronic ticket; decoding, by the processor of the user device, the information and instructions in the electronic ticket code; and sending, by the processor of the user device, a signal to a sensor on the ticket device to obtain the electronic ticket. A system and computer product for paperless electronic queue ticketing are also provided.

15 Claims, 4 Drawing Sheets

METHOD AND SYSTEM FOR PAPERLESS ELECTRONIC QUEUE TICKETING

DOMESTIC PRIORITY

This application is a continuation of U.S. patent application Ser. No. 14/968,964, filed Dec. 15, 2015, the contents of which in its entirety are herein incorporated by reference.

BACKGROUND

The present invention relates to a method and system for queue ticketing, and more specifically, to a method and system for paperless electronic queue ticketing.

Queue management ticketing systems based on paper queue tickets are widely used in many locations to manage the order in which customers receive assistance, such as department stores and post offices. Although use of these systems is prevalent, there are a number of drawbacks associated with these systems. Drawbacks of these systems include the reliance on the use of significant amounts of paper to generate paper tickets, replacement of paper rolls, replacement of printer ink, maintenance and repair of the printer mechanism and other device mechanisms. Thus, the drawbacks associated with these systems include both ecological and economical disadvantages.

Therefore, a need exists for a queue ticketing system which addresses one or more of these ecological and economical drawbacks.

SUMMARY

According to an embodiment of the present invention, a computer-implemented method for paperless electronic queue ticketing comprises reading, by a processor of a user device, an electronic ticket code displayed on a ticket device, the electronic ticket code having information and instructions for an electronic ticket; decoding, by the processor of the user device, the information and instructions in the electronic ticket code; and sending, by the processor of the user device, a signal to a sensor on the ticket device to obtain the electronic ticket.

According to another embodiment of the present invention, a system for paperless electronic queue ticketing, the system comprising a user device display a user device memory; a user device processor communicatively coupled to the user device display and the user device memory, where the user device processor is configured to read, by the user device display, an electronic ticket code displayed on a ticket device; decode information and instructions in the electronic ticket code; and send a signal to a sensor on the ticket device to obtain an electronic ticket. According to another embodiment of the present invention, a computer program product for paperless electronic queue ticketing, the computer program product comprising a user device computer readable storage medium having a computer readable program code embodied therewith, the computer readable program code configured to read the electronic ticket code displayed on the ticket device; decode information and instructions in the electronic ticket code; and send a signal to a sensor on the ticket device to obtain the electronic ticket.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
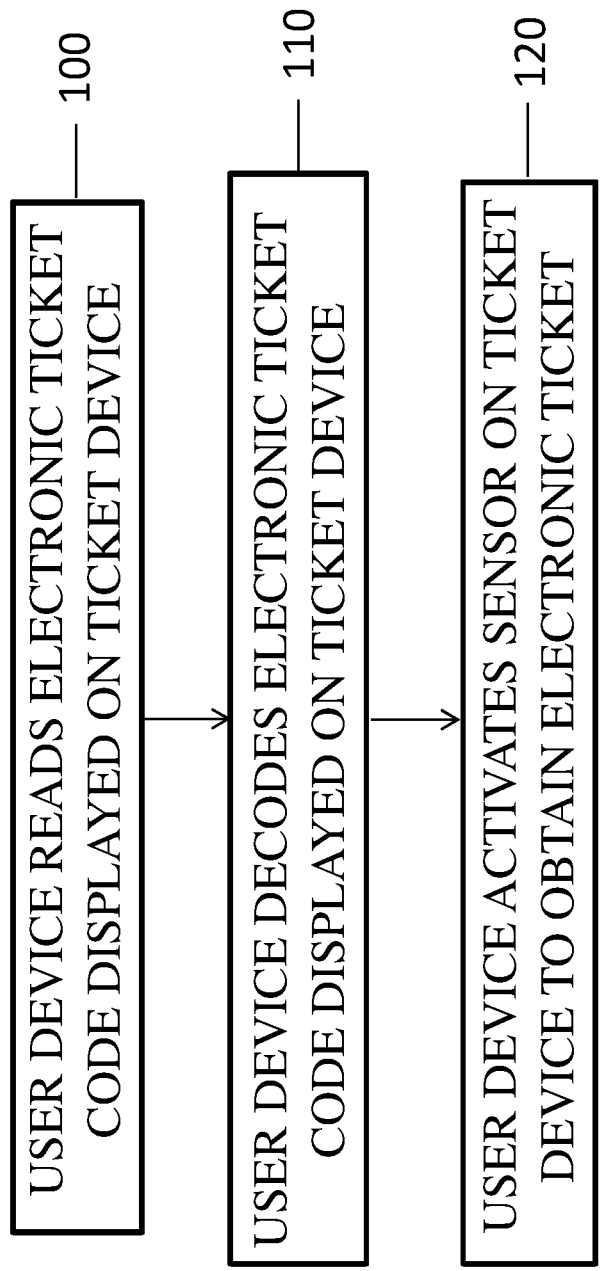
FIG. 1 is a flow chart of an embodiment of the computer-implemented method for paperless electronic queue ticketing.

With reference now to FIG. 1, a flow chart of an embodiment of the computer-implemented method for paperless electronic queue ticketing is shown. The process begins in step 100 in which a user device reads, or scans, an electronic ticket code displayed on a ticket device. In step 110, the user device decodes the information and response instructions encoded in the electronic ticket code displayed on the ticket device. Then, in step 120, the user device activates a sensor on the ticket device to obtain an electronic ticket.

Figure 2A:
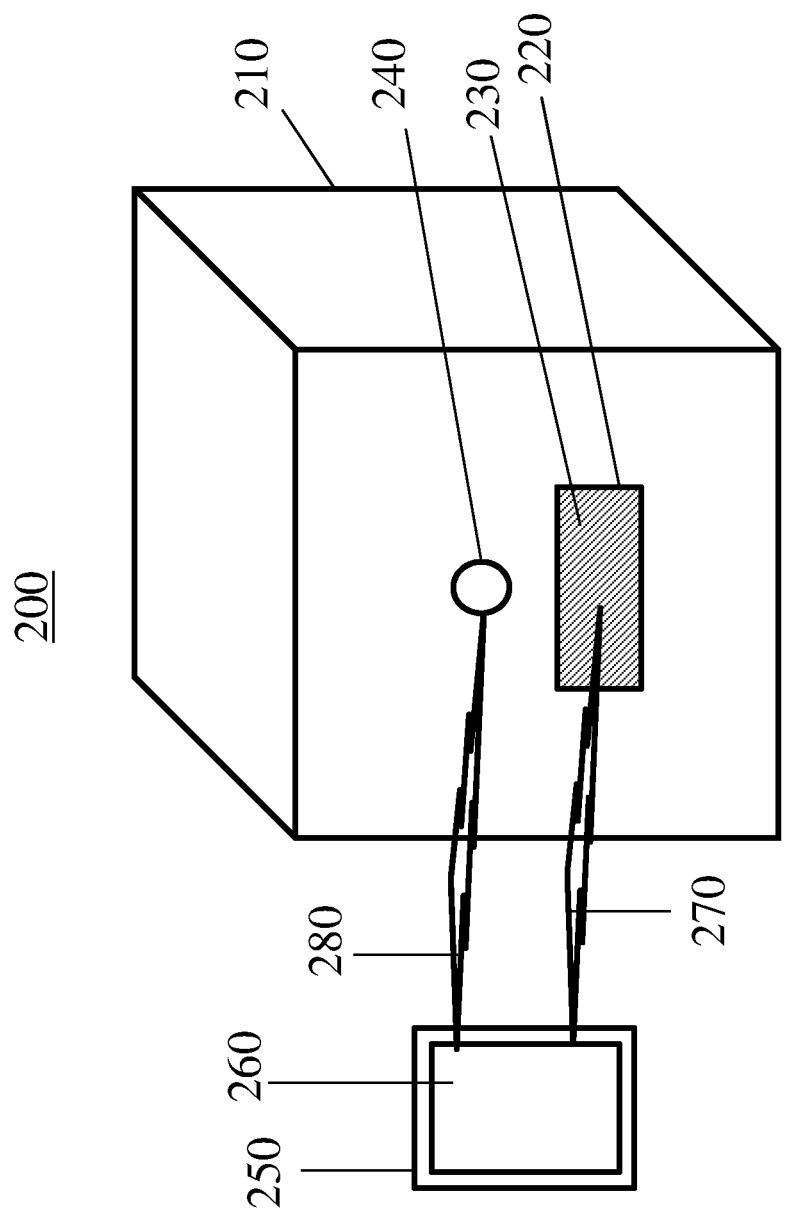
FIG. 2A is a functional diagram illustrating an embodiment of a paperless electronic queue ticketing system.

Referring to FIG. 2A, a functional diagram illustrating an embodiment of a paperless electronic queue ticketing system 200 is shown. A ticket device 210 includes a ticket device display 220 which displays, by a processor (not shown) of the ticket device, an electronic ticket code 230 for a current ticket in a ticket number queue. The ticket device 210 further includes a sensor 240. A user device 250 having a user device display 260 reads 270, by the user device display 260 and a processor (not shown) of the user device, the electronic ticket code 230 displayed on the ticket device 210. The user device 250 decodes, by the processor (not shown) of the user device, the electronic ticket code 230 to read ticket code information and response instructions encoded thereon. The user device 250 then emits, by the processor (not shown) of the user device, a signal 280 to the sensor 240 on the ticket device 210 to send an acknowledgement response to the ticket device and obtain the electronic ticket.

After the sensor 240 on the ticket device 210 receives the acknowledgement response signal 280 from the user device 250 to obtain the electronic ticket, by the processor of the ticket device (not shown), the ticket device 210 advances to the subsequent ticket number in the electronic ticket queue and displays a computer-readable electronic ticket code 230 having ticket information and instructions for the subsequent electronic ticket in the electronic ticket queue on the display 220 of the ticket device 210 for the next user in line.

An example of the ticket code information encoded in the electronic ticket code 230 includes, but is not limited to, a current ticket number in the electronic ticket queue. For example, ticket code information may include "A14" as a current ticket number, and "A15" as the subsequent ticket number, in the electronic ticket queue.

The ticket code instructions direct the user device 250 to send a signal 280 that is detectable by the sensor 240 on the ticket device 210 to obtain an electronic ticket. The instructions encoded in the electronic ticket code include uniform resource identifier ("URL") parameters for emitting a signal, e.g., a flash or series of flashes, from the user device to send an acknowledgement response to a sensor on the ticket device to obtain the current electronic ticket. In an embodiment, the electronic ticket code 230 is a matrix barcode. In another embodiment, the electronic ticket code 230 is a Quick Response® ("QR") code. In another embodiment, the instructions in the electronic ticket code 230 comprise a predetermined duration of time in which the signal 280 may be received by the sensor 240 on the ticket device 210 in order to obtain the current electronic ticket in the electronic ticket queue.

In an embodiment, the user device 250 may be configured to read the electronic ticket code 230 using a software program installed on the originally manufactured user device hardware. In another embodiment, the user device 250 may be configured to scan and read the electronic ticket code 230 using a software application downloaded onto the user device, e.g., from an application store.

In an embodiment, the computer-implemented method is paperless. The computer-implemented method to obtain an electronic ticket does not generate a paper ticket or other printed paper. In another embodiment, the user device 250 is not in wireless communication with the ticket device 210. In yet another embodiment, the ticket device 210 is not connected to a computer network. In still yet another embodiment, the electronic ticket is obtained without any physical contact between the user device 250 and the ticket device 210. In yet another embodiment, the electronic ticket is obtained without any physical contact between a user and the ticket device 210.

The ticket device 210 may be employed on-site at any desired location where a ticket queue management system is desired. Examples of on-site locations for the ticket device 210 include, but are not limited to, department stores, post offices, delis, restaurants, e.g., to manage restaurant seating availability or orders, retail stores, offices, coat checks, valet parking and event passes, e.g., for re-entry or food and/or beverage consumption.

Figure 2B:
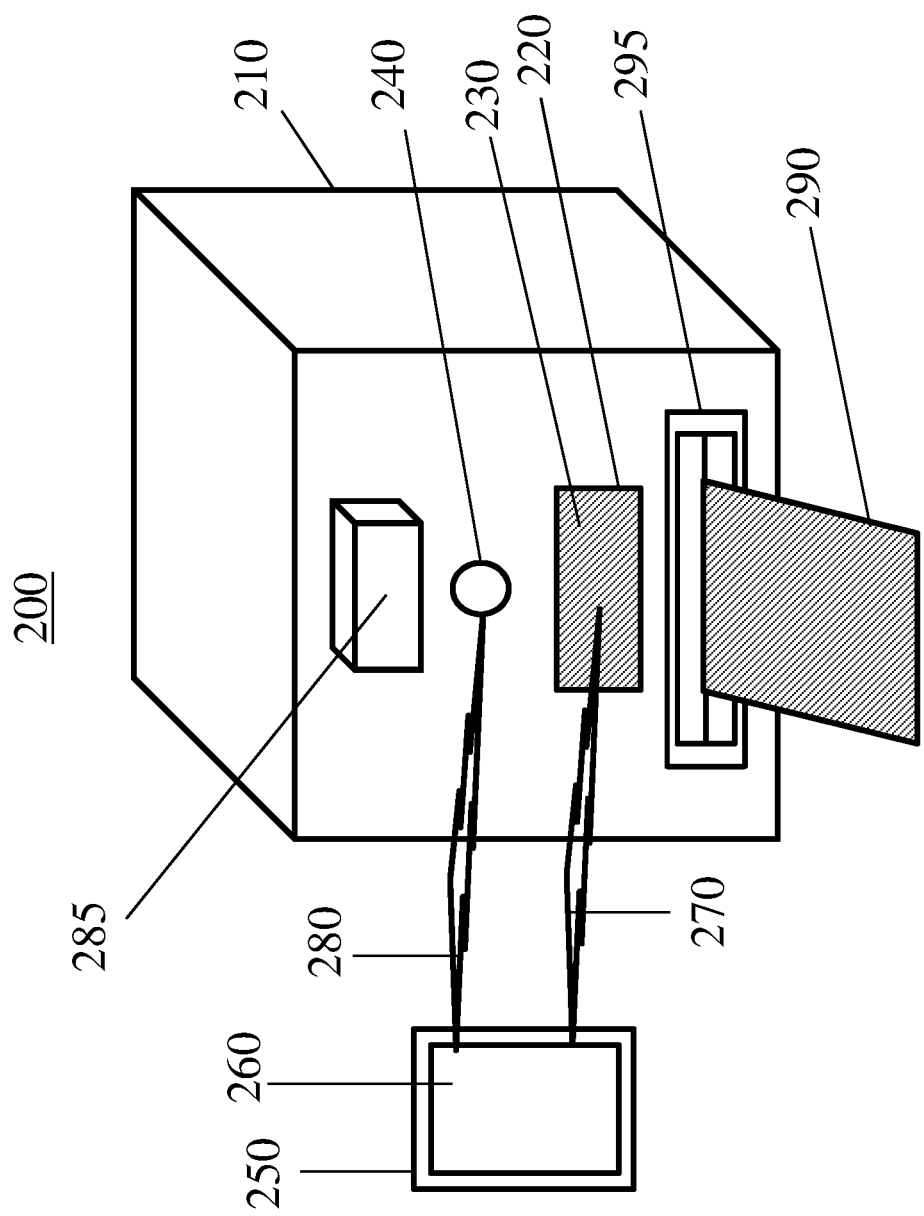
FIG. 2B is a functional diagram illustrating an alternative embodiment of a paperless electronic queue ticketing using a modified paper queue ticket device of FIG. 2A.

Although the ticket device 210 is shown in FIG. 2A as a stand-alone ticket device operatively configured to generate electronic tickets, as discussed below, the ticket device may be incorporated into existing ticket devices which generate paper tickets. Referring to FIG. 2B, a functional diagram illustrating an alternate embodiment of a paperless electronic queue ticketing system 200 of FIG. 2A is shown. In this embodiment, a paper ticket queue device has been modified to include the features discussed above with regard to the electronic ticket device 210. The ticket device further includes a button 285 or other ticket device mechanism by which a user physically obtains a paper ticket 290 from a paper ticket dispenser 295 in the ticket device 210. The ticket device 210 is thus operative to generate a paper ticket 290 and/or a paperless electronic ticket, as desired by the user and/or owner.

The signal is configured to emit a signal via a signal emitter on the user device which is capable of being detected by the sensor on the ticket device according to the instructions encoded in the electronic ticket code. In an embodiment, the signal is provided to the sensor on the ticket device by a flash in the user device. More specifically, the signal emitted from the user device and sent to the ticket device is predetermined series, e.g., number and frequency, of light flashes emitted from the flash of the user device. In another embodiment, the signal is provided to the sensor on the ticket device by a speaker in the user device.

The sensor 240 is configured to detect a signal emitted from the user device according to the instructions encoded in the electronic ticket code. In an embodiment, any signal and sensor configured to implement signal-sensor communication may be employed in the computer-implemented method. In another embodiment, the flash on the user device is used as the signal to activate a light sensor on the ticket device. In another embodiment, the speaker on the user device is used as the signal to activate a sound sensor, e.g., speaker, on the ticket device. In another embodiment, a radio-frequency identification emitter in the user device is used as the signal to activate a radio-frequency identification sensor on the ticket device. In another embodiment, a near field communication emitter in the user device is used as the signal to activate a near field communication sensor on the ticket device. The respective combinations of sensors and signals described above may be used separately or in any combination, or in a combination of at least one of the foregoing methods of signal-sensor communication.

The computer-implemented method for paperless electronic queue ticketing can be incorporated into existing paper ticket queue devices or used as a stand-alone ticket device installed on-site at locations where queue ticketing is desired. The method reduces or eliminates the use of paper tickets, thereby reducing the ecological impact of paper waste generated by such devices as well as reducing the costs associated with maintaining and repairing printers and replacing paper and ink. The method provides a convenient and efficient manner for providing electronic tickets quickly without physical contact between the user device and the ticket device, without being connected to a network and without wireless communication between the user device and the ticket device.

In another embodiment, a system for paperless electronic queue ticketing, the system comprising a user device display a user device memory; a user device processor communicatively coupled to the user device display and the user device memory, where the user device processor is configured to read, by the user device display, an electronic ticket code displayed on a ticket device; decode information and instructions in the electronic ticket code; and send a signal to a sensor on the ticket device to obtain an electronic ticket.

In another embodiment, a computer program product for paperless electronic queue ticketing, the computer program product comprising a user device computer readable storage medium having a computer readable program code embodied therewith, the computer readable program code configured to read the electronic ticket code displayed on the ticket device; decode information and instructions in the electronic ticket code; and send a signal to a sensor on the ticket device to obtain the electronic ticket.

Figure 3:
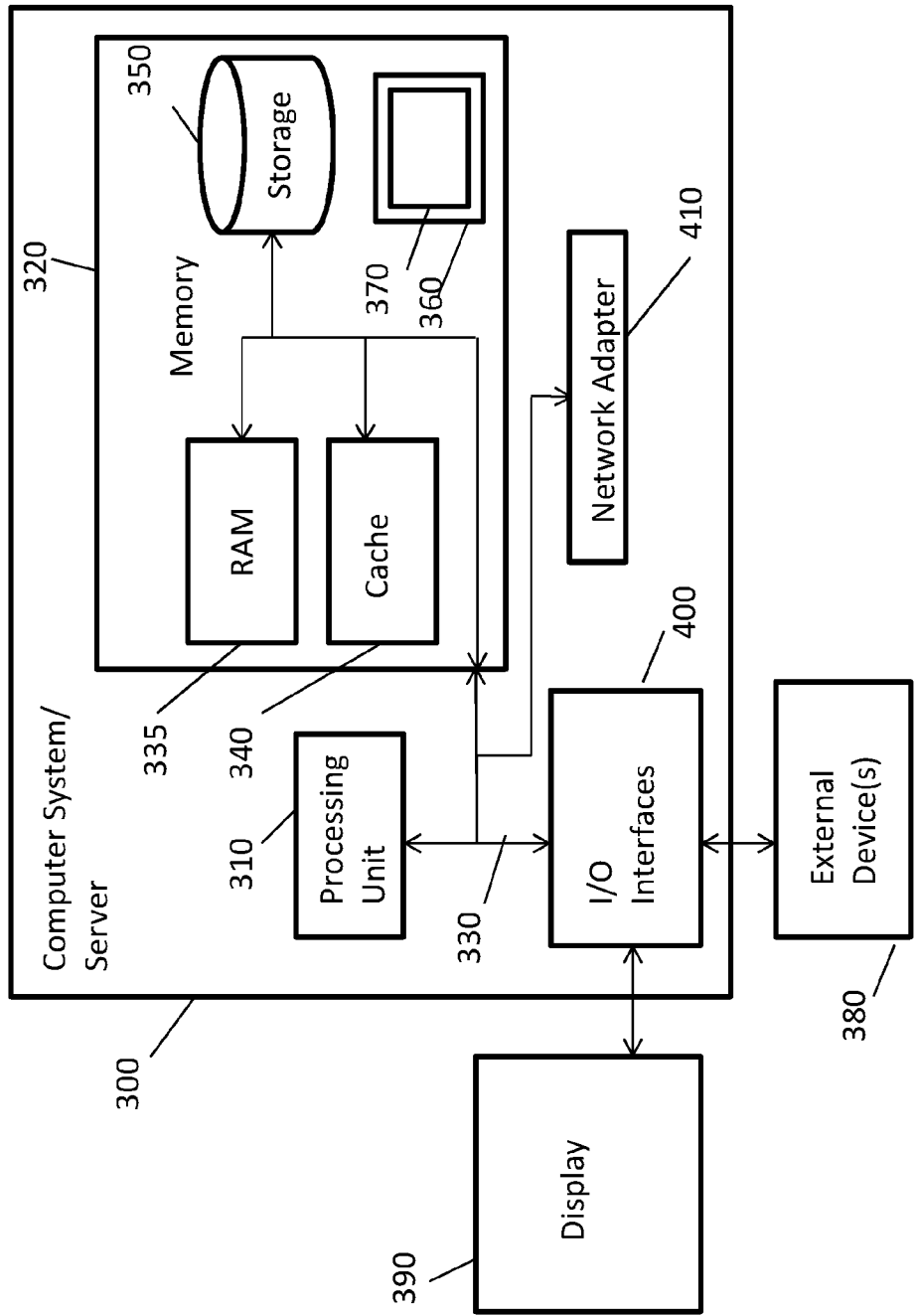
FIG. 3 is a block diagram illustrating an embodiment of an information processing system.

Referring to FIG. 3, a block diagram illustrating an information processing system is shown. The information processing system 300 is based upon a suitably configured processing system configured to implement one or more embodiments described herein. Any suitably configured processing system can be used as the information processing system 300 in the embodiments described herein. The components of the information processing system 300 can include, but are not limited to, one or more processors or processing units 310, a system memory 320 and a bus 330 that couples various system components including the system memory 320 to the processor 310.

The bus 330 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture bus, Enhanced ISA bus, Video Electronics Standards Association local bus and Peripheral Component Interconnects bus.

The system memory 320 can includes computer system readable media in the form of volatile memory, such as random access memory ("RAM") 335 and/or cache memory 340. The information processing system 300 can further include other removable/non-removable, volatile/non-volatile computer system storage media. By way of example only, a storage system 350 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 330 by one or more data media interfaces. The memory 320 can include at least one program product having a set of program modules that are configured to carry out the functions of the embodiment described herein.

Program/utility 360, having a set of program modules 370, may be stored in memory 320 by way of example, and not limitation, as well as an operating system, one or more application programs, other program modules, and program data. Each of the operating system, one or more application programs, other program modules, and program data or some combination thereof, may include an implementation of a networking environment. Program modules 370 generally carry out the functions and/or methodologies of the embodiments described herein.

The information processing system 300 can also communicate with one or more external devices 380 such as a keyboard, a pointing device, a display 390, etc.; one or more devices that enable a user to interact with the information processing system 300; and/or any devices, e.g., network card, modem, etc., that enable computer system/server 300 to communicate with one or more other computing devices. Such communication can occur via I/O interfaces 400. Still yet, the information processing system 300 can communicate with one or more networks such as a local area network, a general wide area network, and/or a public network, e.g., the Internet, via network adapter 410. As depicted, the network adapter 410 communicates with the other components of information processing system 300 via the bus 330. Other hardware and/or software components can also be used in conjunction with the information processing system 300. Examples include, but are not limited to: microcode, device drivers, redundant processing units, external disk drive arrays, RAID systems, tape drives and data archival storage systems.

Certain aspects of the embodiments described herein may be a system, method, or computer program product. Accordingly, the embodiments described herein may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of instructions which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for paperless electronic queue ticketing, the method comprising:
    reading, by a processor of a user device, an electronic ticket code displayed on a ticket device, the electronic ticket code having information and instructions for an electronic ticket;
    decoding, by the processor of the user device, the information and instructions in the electronic ticket code; and
    sending, by the processor of the user device, a signal to a sensor on the ticket device to obtain the electronic ticket, wherein the signal is provided to the sensor on the ticket device by a speaker in the user device.

2. The computer-implemented method of claim 1, wherein the electronic ticket code is a matrix barcode.

3. The computer-implemented method of claim 1, wherein the sensor on the ticket device is a light sensor.

4. The computer-implemented method of claim 1, wherein the sensor on the ticket device is a speaker.

5. The computer-implemented method of claim 1, wherein the signal is a radio-frequency identification signal and the sensor on the ticket device is a radio-frequency identification sensor.

6. The computer-implemented method of claim 1, wherein the signal is a near field communication signal and the sensor on the ticket device is a near field communication sensor.

7. The computer-implemented method of claim 1, wherein the ticket device is not connected to a computer network.

8. The computer-implemented method of claim 1, wherein the user device is not in wireless communication with the ticket device.

9. The computer-implemented method of claim 1, wherein the electronic ticket is obtained without physical contact between a user device and the ticket device.

10. The computer-implemented method of claim 1, wherein the electronic ticket is obtained without physical contact between the user and the ticket device.

11. The computer-implemented method of claim 1, wherein the information and instructions in the electronic ticket code comprise an electronic ticket number and instructions for sending a signal to the ticket device.

12. The computer-implemented method of claim 1, wherein the information and instructions in the electronic ticket code comprise a predetermined duration of time in which the signal may be received by the sensor on the ticket device.

13. A system for paperless electronic queue ticketing, the system comprising:
    a user device display;
    a user device memory;
    a user device processor communicatively coupled to the user device display and the user device memory, where the user device processor is configured to:
        read, by the user device display, an electronic ticket code displayed on a ticket device;
        decode information and instructions in the electronic ticket code; and
        send a signal to a sensor on the ticket device to obtain an electronic ticket, wherein the signal is provided to the sensor on the ticket device by a speaker in the user device.

14. A computer program product for paperless electronic queue ticketing, the computer program product comprising:
    a user device computer readable storage medium having a computer readable program code embodied therewith, the computer readable program code configured to:
        read the electronic ticket code displayed on the ticket device;
        decode information and instructions in the electronic ticket code; and
        send a signal to a sensor on the ticket device to obtain the electronic ticket.

15. The computer program product of claim 14, wherein the signal is provided to the sensor on the ticket device by a speaker in the user device.

* * * * *